United States Patent [19]
Crofts

[11] Patent Number: 5,720,248
[45] Date of Patent: *Feb. 24, 1998

[54] TORSIONAL TUNABLE COUPLING FOR A DIESEL ENGINE DRIVE SHAFT

[75] Inventor: John G. Crofts, Columbus, Ind.

[73] Assignee: Cummins Engine Company, Inc., Columbus, Ind.

[*] Notice: The term of this patent shall not extend beyond the expiration date of Pat. No. 5,303,681.

[21] Appl. No.: 565,635

[22] Filed: Nov. 29, 1995

Related U.S. Application Data

[63] Continuation of Ser. No. 228,759, Apr. 18, 1994, abandoned, which is a continuation of Ser. No. 32,414, Mar. 15, 1993, Pat. No. 5,303,681, which is a continuation of Ser. No. 936,524, Aug. 28, 1992, abandoned.

[51] Int. Cl.$^6$ ................................................ F02B 75/06
[52] U.S. Cl. .......................................... 123/192.1; 74/574
[58] Field of Search ........................... 123/192.1; 74/572, 74/574; 464/88, 92, 93

[56] References Cited

U.S. PATENT DOCUMENTS

| | | |
|---|---|---|
| 1,653,856 | 12/1927 | Kane . |
| 2,716,873 | 9/1955 | Byers ............................ 74/574 |

(List continued on next page.)

FOREIGN PATENT DOCUMENTS

| | | |
|---|---|---|
| 0163447 | 4/1985 | European Pat. Off. . |
| 830396 | 4/1938 | France . |
| 831320 | 8/1938 | France . |
| 2410173 | 6/1979 | France . |
| 182531 | 2/1906 | Germany . |
| 307177 | 7/1917 | Germany . |
| 66817 | 4/1986 | Japan .................... 123/192.1 |
| 827078 | 2/1960 | United Kingdom . |
| 2049103 | 12/1980 | United Kingdom . |
| 2050570 | 1/1981 | United Kingdom . |
| 2114709 | 8/1983 | United Kingdom . |

OTHER PUBLICATIONS

W. Ker Wilson 'Practical Solution of Torsional Vibration Problems' 1948, Chapman & Hall, London *pp. 434–440*.

W. Ker Wilson 'Practical Solutions of Torsional Vibration Problems' 1948, Chapman & Hall, London (GB) 2nd Edition, vol. I *p. 503*.

"A Practical Treatise on Engine Crankshaft Torsional Vibration Control" by Robert C. Bremer, Jr., 1979. SAE Flywheel Standards, p. 30.

G. E. Parker and D. C. Garvey, "Steady–State Speed Oscillation of Internal Combustion Engines", The American Society of Mechanical Engineers Jan. 1972.

English Abstract for French Patent No. 2,410,173.

*Primary Examiner*—Noah P. Kamen
*Attorney, Agent, or Firm*—Sixbey, Friedman, Leedom & Ferguson, P.C.; Charles M. Leedom, Jr.; Eric J. Robinson

[57] ABSTRACT

An improved coupling assembly is provided for transmitting rotary power from the working end of an internal combustion engine to a driven shaft. The crankshaft also has a free end connected to an accessory drive train. The coupling assembly comprises a low inertia flywheel having a mass so selected as to cause the node of the first crankshaft mode of torsional vibration to be located in the vicinity of the middle of the crankshaft, and a flexible coupling which interconnects the working end of the crankshaft with the driven shaft. The low inertia flywheel not only reduces the amplitude of the torsional deflection at the free end of the crankshaft, but further raises the primary torsional vibration orders of the engine which excite the coupling assembly by at least one half of an order such that the peak stresses applied to the teeth of the first gear wheel of the accessory drive train are at least halved and are further applied to at least twice as many gear teeth, thereby greatly prolonging the life of the gear wheel. Moreover, the low inertia flywheel further increases the lifetime of the flexible coupling by raising its natural frequency to a level which is substantially higher than the 0.5 engine order of torsional vibration associated with engine malfunction and governor interaction.

5 Claims, 7 Drawing Sheets

U.S. PATENT DOCUMENTS

| | | | |
|---|---|---|---|
| 2,775,879 | 1/1957 | Doak . | |
| 3,022,679 | 2/1962 | Pipes | 74/574 |
| 3,868,833 | 3/1975 | Noe et al. | 74/574 |
| 4,217,766 | 8/1980 | Suckow | 74/574 |
| 4,594,917 | 6/1986 | Ziegler | 74/574 |
| 4,629,443 | 12/1986 | Bordner et al. | 74/411 |
| 4,699,098 | 10/1987 | Hoshiba et al. | 74/604 |
| 4,932,921 | 6/1990 | Kobayashi et al. | 74/574 |
| 4,962,677 | 10/1990 | Withers | 74/574 |
| 5,050,446 | 9/1991 | Takashima et al. | 74/574 |
| 5,303,681 | 4/1994 | Crofts | 123/192.1 |

FIG. 7

| NO OF CRANK THROWS | 4 | 6 | 8 |
|---|---|---|---|
| CRANK DIAGRAM | 1,4 — 2,3 | 1,6 / 3,4 \ 2,5 | 1,8 / 4,5 — 2,7 \ 3,6 |
| FIRING ORDER | 1,3,4,2 | 1,5,3,6,2,4 | 1,6,2,5 8,3,7,4 |
| FIRING SEQUENCE | 180° | 120° | 90° |

RELATIVE MAGNITUDES OF TV ORDERS

REMOTE NODE

NEAR F'WHL NODE

CRANK CTR NODE

TORSIONAL TUNABLE COUPLING FOR A DIESEL ENGINE DRIVE SHAFT

This application is a continuation of Ser. No. 08/228,759, filed Apr. 18, 1994, now abandoned; which is a continuation of Ser. No. 08/032,414, filed Mar. 15, 1993, now U.S. Pat. No. 5,303,681, which is a continuation of Ser. No. 07/936,524, filed Aug. 28, 1992, now abandoned.

BACKGROUND OF THE INVENTION

This invention generally relates to engine couplings, and is specifically concerned with an improved, low-inertia coupling assembly for reducing stress in the interface between the ends of a crankshaft and a drive train.

Coupling assemblies for transmitting rotary power from the working end of a crankshaft of an internal combustion engine to a driven shaft are well known in the prior art. Such coupling assemblies generally comprise a high inertia flywheel in combination with a flexible coupling which interconnects the working end of the crankshaft with the driven shaft. The flexible coupling may include a resilient member formed from an elastomeric material. Such couplings are most typically used in diesel engines, and the primary purpose of the high-inertia flywheel is to smooth out the amplitude of the torque generated by the working end of the crankshaft. A secondary purpose of the flywheel is to provide a mount for the ring gear which engages the output gear of the starter motor of the engine. The flexible coupling utilized in such prior art assemblies not only serves the function of mechanically interconnecting the working end of the crankshaft with a driven shaft; the flexibility provided by the elastomeric material in the coupling advantageously dampens impulse torques which might otherwise be generated between the crankshaft and the driven shaft. Such unwanted impulse torques may occur, for example when the driven shaft is a cardan-type shaft, and the elastomeric material provided in such a flexible coupling allows the coupling to drive such a shaft for a maximum amount of time without failure.

While such prior art coupling assemblies have performed satisfactorily in the past, the applicant has observed a number of shortcomings in the performance of such couplings as the power of diesel engines has increased over the years. For example, the applicant has noted that the relatively large inertias associated with the flywheels of prior art couplings (typically between 150 and 400 lbs*ft$^2$ in diesel engines of between about 500 and 2000 horsepower) tend to cause the node of the first mode of crankshaft torsional vibration to be located in the vicinity of the flywheel itself. Such a location has the effect of maximizing the amplitude of the torsional vibration experienced by the free end of the crankshaft. Since the free end of the crankshaft of such diesel engines is typically connected to an accessory drive train such as the timing gear train and vehicle accessory drives, the relatively large amplitude of torsional movement of the free end of the crankshaft creates undesirable stress in this gear train which is particularly intense with respect to the teeth of a crank nose pinion of the gear train.

The applicant has also observed three other major problems that come about as a result of the relatively large mass of the flywheels used in such prior art couplings. The first and most important of these problems is concentration of intense stress on only a few of the gear teeth of the gear train driven by the free end of the crankshaft. The inherent natural frequency of the crankshaft mode (or second system mode) of torsional vibration causes the crankshaft to be excited by relatively low engine orders (such as the second, third or fourth orders in a four, six or eight throw diesel crank respectively). Hence, in the case of an eight throw crank, the excitation of the crankshaft mode of torsional vibration in the engine of a prior art flywheel assembly by the fourth engine order results in the same four teeth (located 90° apart) being subjected to very high torsional vibrational stresses with each revolution of the gear wheel. After a period of time, these stresses cause these four gear teeth to fail, thereby necessitating an expensive and time-consuming replacement of the gear wheel. A second problem associated with the use of a high inertia flywheel in such prior art couplings is the relatively low frequency it confers on the coupling mode (first system mode); i.e. frequencies in the range of 15 to 20 hertz. While these frequencies avoid major exciting orders in the engine operating speed range, the engine has to run through the coupling resonance speed during start-up, and can damage the coupling by excessive deflections at such low frequencies.

A third problem occurs if this low coupling mode frequency brings the half-order resonance speed within the upper speed range of the engine. Either a misfiring cylinder, or vigorous governor action will cause a high level of half-order excitation which can damage or break the coupling under these conditions.

Other shortcomings associated with the use of such a high-inertia flywheel include the out-of-balance and bending moment forces that such a flywheel applies to the crankshaft which supports it, as well as the expense necessitated by the precision manufacture and installation of such heavy components in an engine.

Clearly, there is a need for an improved coupling assembly which overcomes the shortcomings and problems associated with the use of high-inertia flywheels in such assemblies.

SUMMARY OF THE INVENTION

The invention is both an apparatus and a method which eliminates or at least ameliorates all the problems associated with prior art coupling assemblies that employ high-inertia flywheels which cause the node of the first crankshaft mode to be located in the vicinity of the flywheel. Specifically, the improved coupling assembly of the invention employs a low inertia flywheel having a mass so selected as to cause the node of the first crankshaft mode of torsional vibration to be located in the vicinity of the middle of the crankshaft, which not only reduces the amplitude of the torsional deflection at the free end of the crankshaft, but also changes the primary engine orders that excite the coupling assembly from whole number orders to half-orders. These two effects combine to greatly reduce the stress at the interface between the free end of the crankshaft and a drive train connected to this end. For example, where this interface is defined by the gear teeth of a timing gear, the changing of the primary exciting orders of torsional vibration by at least one half of an order reduces the peak stresses applied to the teeth of the gear by at least one half, and applies these stresses to at least twice as many gear teeth, thereby greatly prolonging the lifetime of the timing gear.

The improved coupling assembly of the invention preferably includes a flexible coupling which employs an elastomeric element for connecting the working end of the crankshaft with a driven shaft. Referring to FIG. 5, showing a bearing supported shaft, the arrangement of this component of the coupling assembly increases the versatility of the assembly by allowing the driven shaft to be a cardan type shaft. The use of a low-inertia flywheel in the coupling assembly advantageously increases the natural frequency of the combination of the flexible coupling and the flywheel to a level which is substantially higher than the 0.5 engine order associated with governor action and engine malfunction, thereby eliminating or at least greatly diminishing the probability of coupling failure as a result of spurious excitation over the life of the engine. In the preferred embodiment, the flexible coupling is a shear-block coupling which can act as a mechanical "fuse" should the relative torque between the crankshaft and driven shaft exceed a predetermined safe level.

The coupling assembly of the invention may further include a means for tuning or adjusting the mode of the coupling assembly formed from a manually removable retaining ring for facilitating the replacement of the elastomeric member of the flexible coupling with another elastomeric member having different hardness characteristics.

The driven shaft may be a floating shaft, and the flexible coupling may further include a centering ring for maintaining the concentricity of one end of the floating shaft with the flexible coupling. Additionally, one edge of the centering ring may be connected to the retaining ring and the centering ring may circumscribe the driven member of the flexible coupling. The use of such a centering ring obviates the need for one of the bearing assemblies which normally rotatably supports such a floating shaft.

Alternatively, the coupling assembly of the invention may integrally include a bearing assembly for rotatably supporting one end of the driven shaft, which would not only obviate the need for a separate bearing assembly to be constructed somewhere along the length of the driven shaft, but which would also conveniently ensure an on-center, concentric relationship between the coupling assembly and one end of the driven shaft. A housing is also preferably provided that not only encloses both the flywheel and the flexible coupling, but also supports the previously mentioned, integrally-provided bearing assembly as well.

BRIEF DESCRIPTION OF THE DRAWINGS

FIG. 7 is a graph illustrating the relationship between engines having 4, 6 and 8 crank throws and the relative magnitudes of the various orders of torsional vibration.

DETAILED DESCRIPTION OF THE PREFERRED EMBODIMENT

Figure 1:
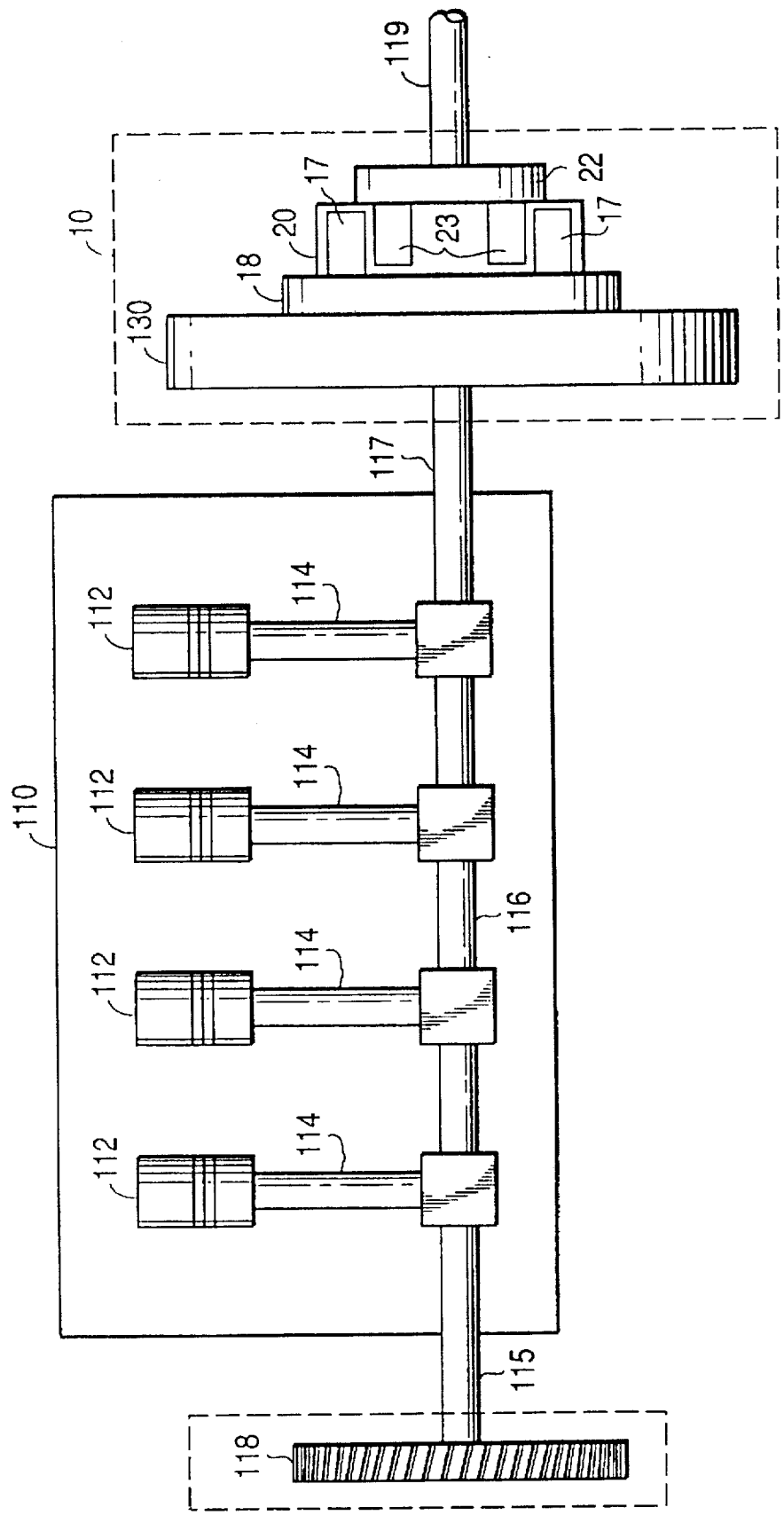
FIG. 1 is a schematic representation of a prior art diesel engine system in which the engine coupling assembly of the present invention can be employed.

FIG. 1 shows a prior art diesel engine system of which the current invention can be a part. Shown in FIG. 1 is crank pinion gear 118, diesel engine 110, engine coupling assembly 10, and output shaft 119. Diesel engine 110 is a four crank throw engine of the type including four pistons 112 connected through connecting rods 114 to engine crankshaft 116. Engine crankshaft 116 has a free end 115 and a flywheel end 117. A four crank throw diesel engine is shown in FIG. 1, but an engine of any type with any number of crank throws and cylinders could be used with the present invention.

The free end 115 of engine crankshaft 116 is connected to crank pinion gear 118. Typically, crank pinion gear 118 is used to drive a timing gear train and/or vehicle accessory drives (shown schematically in phantom). The flywheel end 117 of engine crankshaft 116 is connected to engine coupling assembly 10. Also connected to engine coupling assembly 10 is output shaft 119.

In FIG. 1, engine coupling assembly 10 contains flywheel 130, driving element 18, driving element teeth 17, flexible coupling 20, driven element 22, and driven element teeth 23. The relationship between these components and their operation is discussed in detail below in conjunction with FIG. 2, which shows the preferred embodiment of engine coupling assembly 10.

FIG. 1 represents the prior art wherein a relatively massive flywheel 130 forms a part of the coupling assembly 10. Such massive flywheels used with such coupling assemblies 10 in the prior art have relatively large inertias, from approximately 150 to 400 lbs*ft$^2$. The primary purpose of using such a flywheel 130 of high inertia is to smooth out the amplitude of the torque generated by the flywheel end 117 of engine crankshaft 116. The large inertias of the prior art flywheels, however, cause the node (location of approximate zero torsional vibration amplitude) of the first mode of crankshaft torsional vibration, which is equivalent to the second system mode of torsional vibration, to be located in the vicinity of the flywheel, near the flywheel end 117 of engine crankshaft 116 in FIG. 1. As a result, the amplitude of the torsional vibration experienced by the free end 115 of engine crankshaft 116 is maximized. The large amplitude of the torsional vibration at the free end 115 of engine crankshaft 116 places undesirable stress on the teeth of crank pinion gear 118. Furthermore, this stress can be transferred through crank pinion gear 118 to a timing gear train or vehicle accessory drive, thereby shortening the life of these components.

Figure 2:
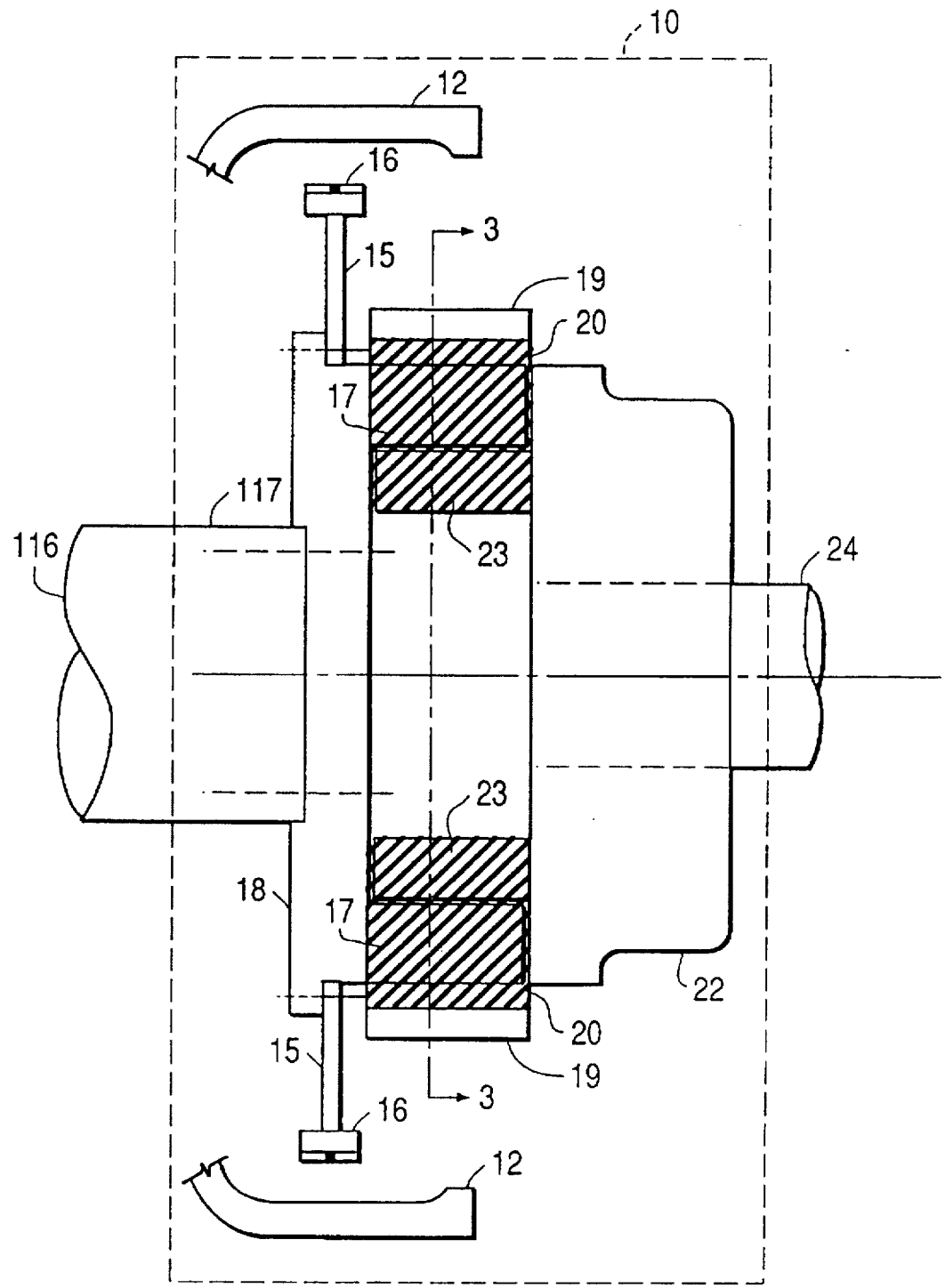
FIG. 2 is a detailed side view of one embodiment of the engine coupling assembly, depicting the present invention, in which the driven coupling is carried by a two bearing shaft.

FIG. 2 shows the preferred embodiment of engine coupling assembly 10 of the present invention. Included in engine coupling assembly 10 are flywheel housing 12, flywheel end 117 of engine crankshaft 116, low inertia flywheel 15, optional ring gear 16, driving element 18, driving element teeth 17, retaining ring 19, flexible coupling 20, driven element 22, driven element teeth 23, and output shaft 24. In this configuration, output shaft 24 would be a two bearing shaft, i.e. output shaft 24 would be supported by two bearings (not shown) spaced apart from each other and the coupling assembly 10.

As shown in FIG. 2, low inertia flywheel 15 connects to driving element 18. Flywheel end 117 of engine crankshaft 116 rigidly connects to driving element 18 and output shaft 24 rigidly connects to driven element 22. Driving element 18 and driven element 22 interact through flexible coupling 20, which is better shown in FIG. 3. Flexible coupling 20 is held in place by retaining ring 19 as described in more detail below. Optional ring gear 16 may be connected to low inertia flywheel 15 to allow for cranking of the engine 110 through driving element 18 and engine crankshaft 116.

Flywheel housing 12 preferably encloses both low inertia flywheel 15 and flexible coupling 20.

In operation, engine crankshaft 116 will supply rotary power to driving element 18. Driving element 18 will in turn provide rotary power to driven element 22 and output shaft 24 through flexible coupling 20. The mass of low inertia flywheel 15 is selected so as to locate the node of the first mode of crankshaft torsional vibration, which is equivalent to the second system mode of torsional vibration, approximately in the middle of engine crankshaft 116, as opposed to having the node located on the end of the engine crankshaft 116 near the flywheel 15 as would result from prior art flywheel systems. For example, prior art flywheel systems used with engines of approximately 500 to 2000 horsepower employed flywheels having inertias from approximately 150 to 400 lbs*ft$^2$. The relatively large inertias associated with these prior art flywheels resulted in a torsional vibration node, having approximately zero amplitude, in the engine crankshaft near the junction of the crankshaft with the flywheel. Furthermore, such large inertias resulted in a torsional vibration having maximum amplitude at the free end 115 of engine crankshaft 116.

The present invention employs a low inertia flywheel having an inertia approximately 5 to 10 times lower, from approximately 15 to 80 lbs*ft$^2$, than that of prior art flywheel systems. Due to the relatively large inertias associated with the internal components of high horsepower diesel engines, applicant has discovered that a high inertia flywheel is not required, and in fact is detrimental to the operation of engine. As a result of the use of a low inertia flywheel, the amplitude of the torsional vibration in engine crankshaft 116 at the free end is reduced by a factor of at least two. This reduction in torsional vibration amplitude leads to a reduction in stress at the interface between the free end 115 of engine crankshaft 116 and the drive train connected thereto, which increases the life expectancy of the drive train. Specifically, by reducing the amplitude at free end 115 of engine crankshaft 116, the stress on the teeth of crank pinion gear 118 is greatly reduced. As a result, the life expectancy of crank pinion gear 118 is increased. Furthermore, by moving the location of the node of the first mode of crankshaft torsional vibration to the center of engine crankshaft 116, the torsional stress on flywheel end 117 of engine crankshaft 116 is reduced, thereby increasing the life expectancy of engine crankshaft 116.

Engine coupling assembly 10 could be an Atra-flex model A-8 coupling assembly manufactured by ATR Inc. The commercially available coupling is modified for use with the present invention to allow coupling between a flywheel assembly and an output shaft rather than coupling between an input shaft and output shaft. This modification, however, must be made without adding additional mass to the coupling assembly so that the desired low inertia assembly is achieved.

Figure 3:
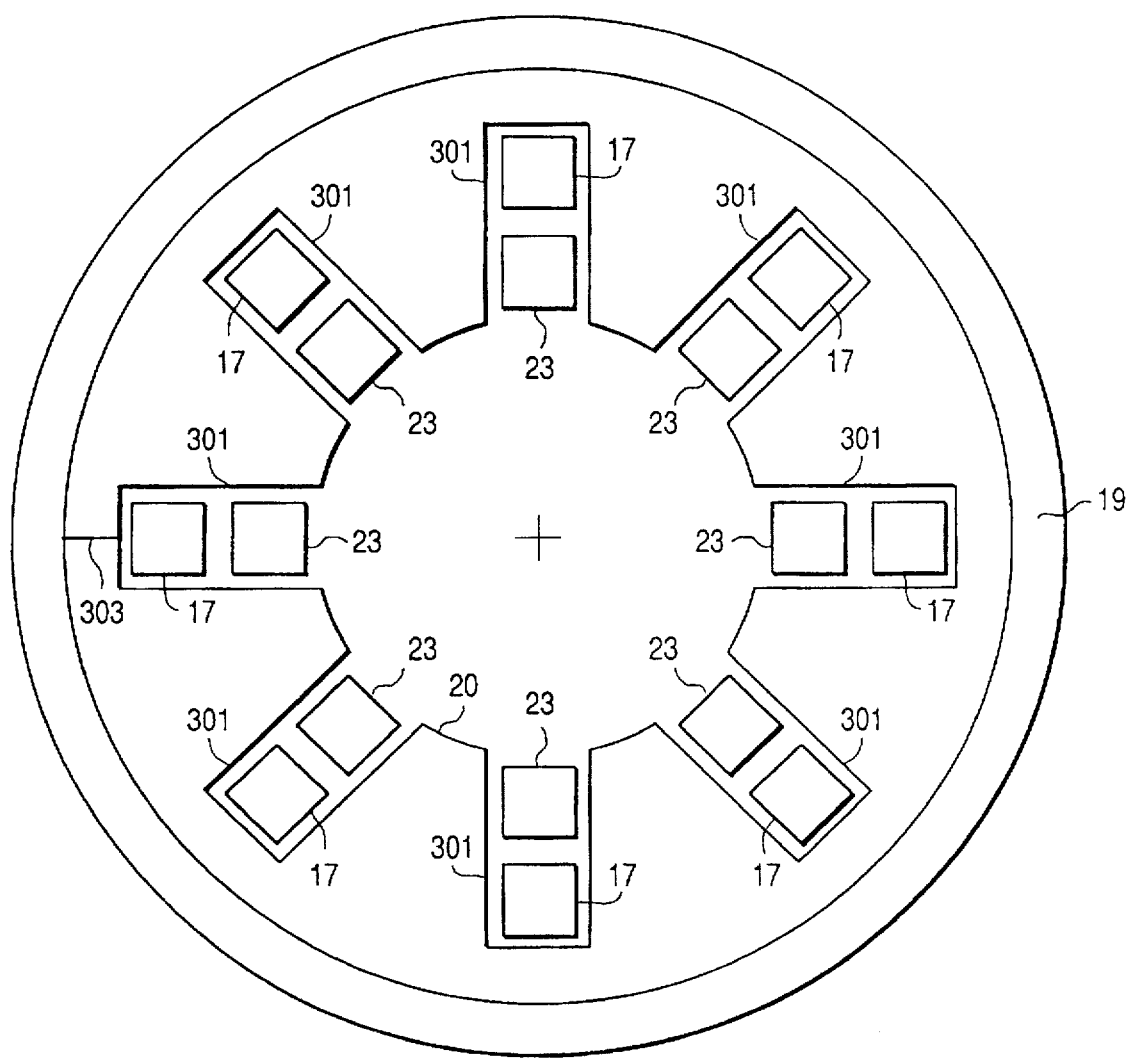
FIG. 3 is a cross sectional view of the flexible coupling assembly of FIG. 2 taken along line 3—3.

FIG. 3 shows a cross sectional diagram of the flexible coupling 20 taken along line 3—3 in FIG. 2. FIG. 3 shows flexible coupling 20, retaining ring 19, driving element teeth 17 and driven element teeth 23. As seen in FIG. 3, driving element teeth 17 and driven element teeth 23 are encased in slots 32 of flexible coupling 20. Retaining ring 19 circumferentially surrounds flexible coupling 20 to maintain flexible coupling 20 in position during operation.

In operation, driving element teeth 17, as a result of the connection to the engine crankshaft 116 through driving element 18 discussed above in conjunction with FIG. 2, will exert a rotational force on flexible coupling 20. This force will be transferred through flexible coupling 20 to driven element teeth 23. As a result, power will be transferred to output shaft 24 through driven element 22 as discussed above in reference to FIG. 2.

Retaining ring 19 is used to prevent flexible coupling 20 from disengaging with driving element teeth 17 and driven element teeth 23. During operation, the centrifugal force exerted on retaining ring 19 from flexible coupling 20 will hold retaining ring 19 in position. When the coupling assembly is stationary, however, retaining ring 19 can be easily removed to allow replacement of flexible coupling 20. To facilitate replacement, flexible coupling 20 is provided with a radially oriented slit 303, which will allow flexible coupling 20 to be, in effect, unwound from and easily removed from the coupling and replaced.

Flexible coupling 20 will conform slightly due to the force applied by driving element teeth 17. By varying the elastomeric properties of flexible coupling 20 (i.e. spring constant), it is possible to fine tune the resonant frequency of the coupling. The particular advantages and methods by which this can be done are discussed further below.

Figure 4:
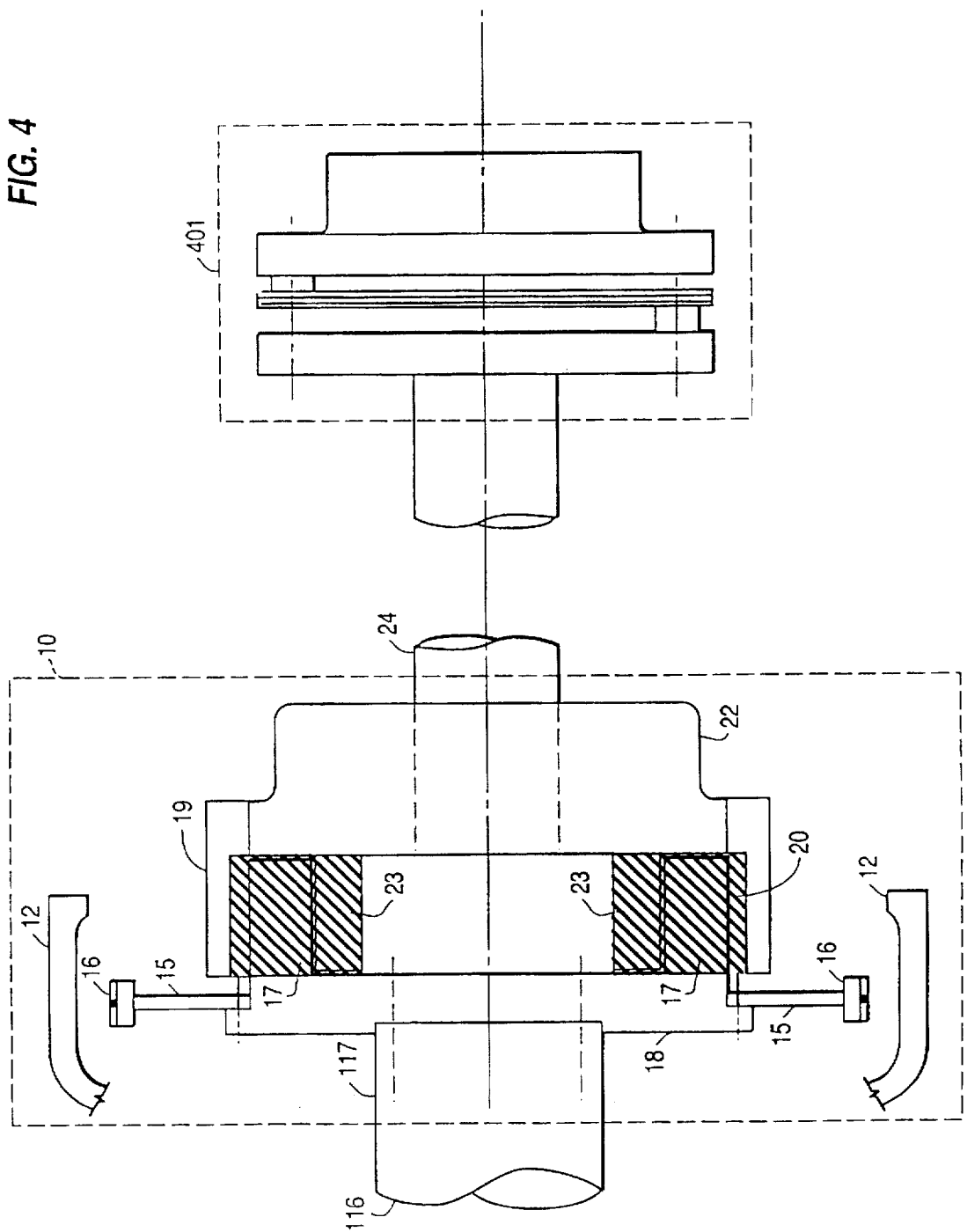
FIG. 4 is an alternate embodiment of the engine coupling assembly shown in FIG. 2 in which a centering ring is used to support a floating shaft drive suitable for use where precise alignment is not needed and quick changes are desirable.

Referring now to FIG. 4, an alternate embodiment of the engine coupling assembly 10, which is suitable for use where precise alignment is not needed and quick changes are desirable, is shown. The structure of engine coupling assembly 10 is identical to that described above in connection with FIG. 2 except that retaining ring 19 shown in FIG. 2 has been removed and centering ring 40 has been added. With the addition of centering ring 40, retaining ring 19 is no longer needed. The flexible coupling 20 is now held in place during operation by centering ring 40. As best seen in FIG. 4, centering ring 40 is rigidly connected to driven element 22 and surrounds flexible coupling 20. By using centering ring 40 in this way, the concentricity of output shaft 24 relative to driving element 18 is maintained. Therefore, in this configuration, only one bearing is required to be used with output shaft 24, which acts as a floating shaft. Output shaft 24 could be connected to a flexplate assembly 401 or gear coupling (not shown). This coupling configuration is particularly advantageous when frequent quick changes are desirable and precise alignment is not necessary. Specific uses could include dynamometer drives and other engine or load test applications.

Figure 5:
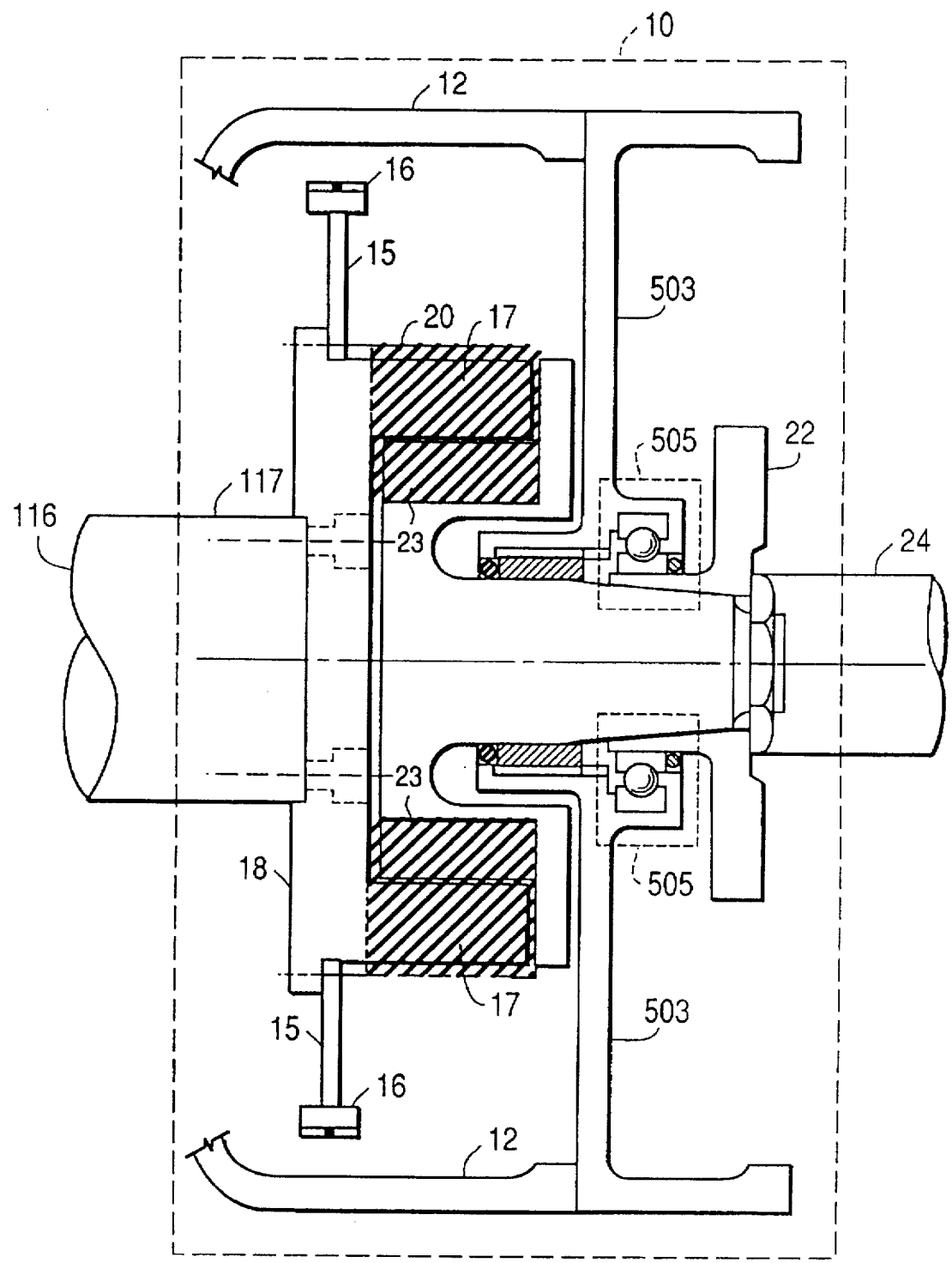
FIG. 5 is an alternate embodiment of the engine coupling assembly shown in FIG. 2 in which an integral bearing assembly suitable to drive a cardan shaft or single bearing generator is provided.

A third embodiment of the engine coupling assembly 10 is shown in FIG. 5. Here, an integral bearing assembly is incorporated into engine coupling assembly 10. The bearing assembly contains support flanges 503, bearings 505, and driven element 22. Support flanges 503 are rigidly connected to flywheel housing 12 and support driven element 22 through bearings 505. The bearing assembly rotatably supports output shaft 24, which obviates the need for a separate bearing assembly to be constructed somewhere along the length of the driven shaft. Additionally, the bearing assembly ensures that output shaft 24 will be maintained in a concentric relationship with engine coupling assembly 10. A bearing assembly of this type would typically be used to drive a cardan type shaft or single bearing generator. However, other possible shaft configurations could be used where an integral bearing assembly is advantageous.

Figure 6:
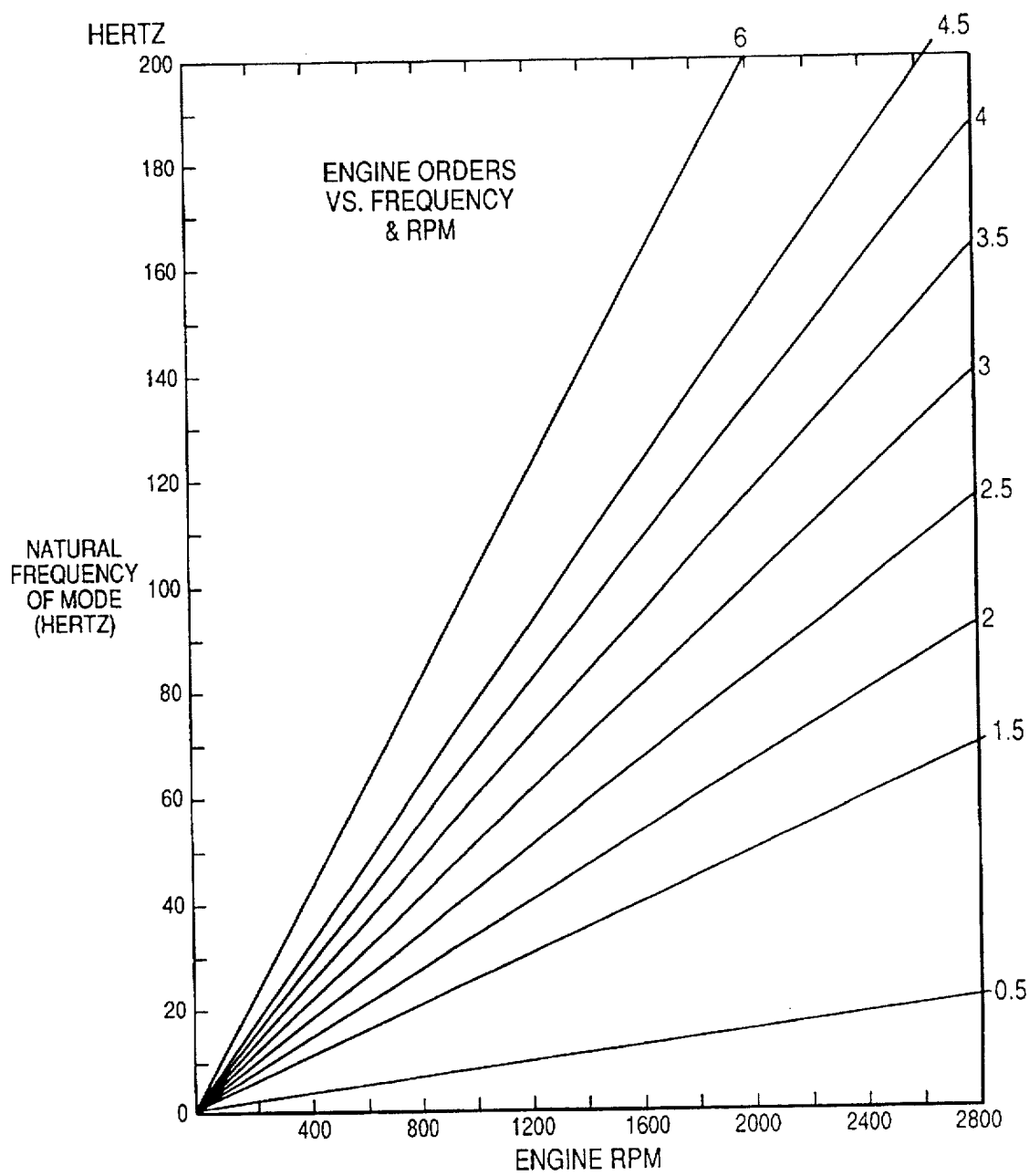
FIG. 6 is a Campbell diagram showing the relationship between system mode frequencies, engine RPM, and engine excitation orders.

FIG. 6 is a Campbell, or interference, diagram showing the relationship between system mode frequencies, engine RPM, and engine excitation orders, which represent the number of vibrations occurring per revolution of the engine crankshaft 116. The Y-axis of the graph represents the natural frequency of a system mode in hertz. The X-axis of the graph represents the engine speed in rotations-perminute (RPM). The engine excitation orders of 0.5, 1.5, 2, 2.5, 3, 3.5, 4, 4.5, and 6 are plotted as lines on the graph.

The natural resonant frequency of the first system mode, or coupling mode, of torsional vibration will be determined by the properties of the elastomeric coupling used in the engine coupling assembly. In particular, the natural frequency, f, of the first system mode of torsional vibration is given by equation 1 below, $$f = \frac{1}{2\pi} \sqrt{\frac{K}{I_e}}$$  Equation 1 where K is the spring constant of the elastomeric coupling and $I_e$ is the effective inertia of the system given by equation 2, $$I_e = \frac{I_1 I_2}{I_1 + I_2}$$  Equation 2 where $I_1$ represents the inertia of the engine components, flywheel, and coupling components attached thereto, and $I_2$ represents the inertia of the driven coupling components, driven shaft, and driven load.

Solving equation 1 and equation 2 with respect to the parameters associated with prior art flywheel systems yields a natural resonant frequency of the first system mode of torsional vibration of approximately 15-20 hertz. If a typical engine operating range of approximately 600 to 2400 RPM is used, FIG. 6 shows that the 0.5 engine excitation order will be present at a 15-20 hertz natural frequency from approximately 1800-2400 RPM.

The 0.5 order is typically not harmful if the engine is operating smoothly. The 0.5 order can, however, be excited as a result of a misfiring cylinder, by the action of an engine speed governor, or from any other occurrence that results in erratic engine operation. If this occurs, the resulting resonance will quickly destroy the elastomeric coupling and require expensive and time consuming repairs.

By referring to FIG. 6, it can be seen that if the first system mode resonant frequency can be raised above approximately 20 hertz, then the 0.5 order mode will no longer be present across the engine operating range from 600 to 2400 RPM. By referring to equation 1, it can be seen that the first system mode resonant frequency, f, can be raised in either of two ways: (1) by raising the spring constant, K, of the coupling, or (2) by lowering the effective inertia, $I_e$, of the system.

The first method, raising the spring constant, K, of the coupling will only result in minor fluctuations in the resonant frequency. This is so because the spring constant must be retained within certain limits in order to maintain the benefits of the flexible coupling. If the spring constant is raised to a point to advantageously effect the resonant frequency, the coupling will no longer be elastomeric. The elasticity of the coupling is required and for this reason, the natural resonant frequency of the coupling cannot be significantly altered by changing the spring constant of the coupling.

The second method of raising the first system mode resonant frequency, by lowering the effective inertia of the system, can be used effectively. From equation 2, it can be seen that the effective inertia can be lowered by lowering either $I_1$ or $I_2$. $I_2$, however, is determined by the load components and is usually beyond the control of the engine manufacturer. Therefore, it is necessary to lower $I_1$, the inertia of the engine components, flywheel, and coupling components attached thereto.

The present invention recognizes this deficiency in prior art systems and solves the problem by providing a low inertia flywheel and coupling assembly. In the system of the present invention, the first system mode resonant frequency is raised to approximately 22-25 hertz, thereby avoiding the 0.5 order mode over the entire operating range of the engine. This is accomplished by selecting a mass for the flywheel assembly such that the inertia of the system results in a frequency, f, of between approximately 22 and 25 hertz as determined from equations 1 and 2 above. Furthermore, the present invention uses the first method discussed above, that of raising the spring constant of the elastomeric coupling, to fine tune the resonant frequency. Slight changes in the spring constant can result in minor alterations to the resonant frequency without effecting the advantages of the flexible coupling, thereby allowing a fine tuning of the coupling resonant frequency. With the improved coupling assembly, the 0.5 order is eliminated across the entire normal operating range of the engine. Therefore, coupling failure as a result of erratic engine operation exciting the 0.5 order is completely avoided with the present invention.

A third advantage of the present invention can be seen by reference to FIGS. 6 and 7. By reducing the mass of flywheel 15, the primary engine orders are changed from whole number orders to fractional orders, preferably odd multiples of 0.5, i.e. 0.5, 1.5, 2.5, 3.5, etc. The primary engine vibration orders include second, third, fourth and sixth orders for a four, six, eight and twelve throw crank respectively. The change in the primary engine vibration orders is particularly advantageous because it causes the stress at the free end 115 of engine crankshaft 116 to be distributed over at least twice as many gear teeth of crank pinion gear 118. In conjunction with the reduction in torsional vibration amplitude that results from a crank center node, this reduced the stress on the gear teeth of crank pinion gear 118 by at least four times.

For example, referring to FIG. 6, if an engine is operating at a synchronous speed of 1800 RPM, and the first mode of crankshaft torsional vibration (second system mode of vibration) has a natural frequency of 120 hertz, the engine will experience fourth order vibrations. This results in exactly four vibration pulses, spaced 90 degrees apart, per revolution of engine crankshaft 116. Each vibration pulse will occur at exactly the same location (0, 90, 180 and 270 degrees) during each revolution. This causes undesirable vibrational stresses to be concentrated on the same gear teeth during each revolution, which leads to earlier failure of these gear teeth. The present invention, however, by reducing the mass of engine flywheel 15, will cause the engine orders to be changed from whole orders to half orders. As a result, the fourth order of the above example changes to 3.5 and 4.5. This results in 3.5 and 4.5, respectively, vibration pulses per revolution of engine crankshaft 116. It will now require two complete revolutions before the vibration pulses will occur on the same gear teeth, thereby distributing the stress over twice as many gear teeth. With a 3.5 primary engine excitation order, the vibration pulses will occur approximately every 102.9 degrees (3.5 pulses per 360 degree revolution equals 1 pulse every 102.9 degrees). With a 4.5 primary engine excitation order, the vibration pulses will occur every 80 degrees (4.5 pulses per 360 degree revolution equals 1 pulse every 80 degrees). The resulting distribution of stress over twice as many gear teeth will result in much longer component life.

The 0.5 order change that results from the present invention can be better seen in FIG. 7. FIG. 7 depicts the resulting engine orders for a prior art near flywheel node and for the crank center node resulting from the present invention for four, six and eight throw crankshafts. For example, an eight throw crankshaft employing a prior art flywheel system in which a torsional vibration node occurs at or near the flywheel results in prominent fourth and eighth orders of torsional vibration. As a result, the stress on a crank pinion gear will be concentrated on the same four or eight teeth respectively. However, if a low inertia flywheel is employed, that results in a crank center node of torsional vibration, FIG. 7 shows that the prominent engine orders become 2.5, 5.5 and 6.5. The resulting stress on a crank pinion gear will therefore be distributed over 5, 10, or 12 teeth respectively.

The following table illustrates the above effect:

TABLE I

| Coupling | Inertia (In-Lb-Sec$^2$) | Natural Resonant Frequency (Hertz) | Vibrational Torque By Engine Order (In-Lbs.) | | |
|---|---|---|---|---|---|
| | | | 3.5 | 4.0 | 4.5 |
| Heavy DCB 834.5 Prior Art | 105 | 14.5 | 6825 | 25611 | 8285 |
| Light Atra A-8 Present Invention | 18 | 24.6 | 10394 | 7218 | 22320 |

Table I illustrates the changes that occur in inertia, natural resonant frequency, and vibrational torque for 3.5, 4, and 4.5 engine excitation orders when a low inertia flywheel of the present invention is used in place of a high inertia flywheel of a typical prior art system. As seen in Table I, the inertia of the system of the present invention is 18 inch-pound-second$^2$; almost a factor of 6 times smaller than the 105 inch-pound-second$^2$ inertia of a typical prior art system. Furthermore, Table I shows that the natural resonant frequency of the improved coupling assembly increases from 14.5 Hertz to 24.6 Hertz.

The change of the primary engine excitation orders from whole orders to half orders is clearly illustrated by Table I. With a high inertia coupling, as used in the prior art, the torque due to the fourth order is 25,611 inch-pounds, while that of the 3.5 and 4.5 orders is 6,825 and 8,285 inch-pounds respectively. With the low inertia flywheel of the present invention, the respective torque for the 3.5, 4, and 4.5 orders is 10,394, 7,218, and 22,320 inch-pounds. As described above, Table I shows that the fourth excitation order has reduced by approximately 18,000 inch-pounds, while the 3.5 order has increased by approximately 3,500 inch-pounds and the 4.5 order has increased by approximately 14,000 inch-pounds. Table I also shows that the peak torque of 25,611 inch-pounds present in the fourth order of a prior art flywheel system is reduced to 22,320 inch-pounds in the present invention. Therefore, not only is the torque spread out over more teeth of a driven gear, but the peak torque value is reduced.

Raising the natural resonant frequency of the coupling mode (first system mode) is also particularly advantageous during engine start-up and shut down. During engine start-up, the rotational speed of the engine will increase from zero to the idle speed. When this occurs, the engine will be required to pass through the primary order of torsional vibration at the resonant frequency of the coupling assembly. Ideally, it is desirable to have the engine RPM associated with the primary excitation order and coupling resonant frequency to be close, within 50 RPM, but below the engine low-idle speed. This is so because the magnitude of the deflections resulting from the primary order are inversely related to the square of the engine RPM.

For example, in an eight throw crank engine the primary exciting order is the fourth order. If the low-idle speed of the engine is 400 RPM, then it is desirable to have the engine RPM associated with the coupling resonant frequency and the fourth excitation order to be between approximately 350 and 400 RPM, and preferably between 390 and 400 RPM. From FIG. 6, it can be seen that at a coupling resonant frequency typical of prior art systems of 16 hertz, the engine speed for a fourth order excitation is approximately 240 RPM. If the coupling resonant frequency is increased to 25 hertz, the engine speed for a fourth order excitation increases to approximately 380 RPM. Therefore, the magnitude of the deflection, which is proportional to the square of the inverse of this difference in RPM will be approximately 2.5 times less in a system with a coupling resonant mode frequency of 25 hertz than in a system with a resonant frequency of 16 hertz. This reduction in magnitude of the deflection will in turn result in a reduction in the stresses that occur on the coupling assembly during engine start-up.

I claim:

1. A method of reducing stress between one end of a rotating crankshaft of an internal combustion engine and a drive train wherein a coupling assembly including a flywheel means transmits rotary power between a second end of said crankshaft opposite the drive train and a driven shaft, the mass of said flywheel being such that the node of the first crankshaft mode is located in the vicinity of the flywheel means, consisting of the single step of reducing the mass of the flywheel means such that said node is moved to the vicinity of the middle of said crankshaft to reduce the amplitude of the torsional deflection of the first end of the crankshaft.

2. The method of claim 1, wherein said flywheel mass is reduced by replacing it with a second flywheel means having a lower mass than the original flywheel means.

3. The stress reducing method defined in claim 1, wherein said coupling assembly includes a flexible coupling, and the reduction of the mass of the flywheel increases the natural frequency of the coupling assembly to a level higher than said 0.5 order of torsional vibration.

4. An improved coupling assembly as defined in claim 3, wherein said flexible coupling includes an elastomeric element characterized by a specific hardness, and further comprising the step of adjusting the natural frequency of said coupling assembly by adjusting the hardness of said elastomeric element.

5. An improved coupling assembly as defined in claim 4, wherein said hardness of said elastomeric element is adjusted by replacing it with another elastomeric element having a different hardness.

* * * * *